United States Patent
Cheng

(10) Patent No.: US 12,052,405 B2
(45) Date of Patent: Jul. 30, 2024

(54) FOLDED PARALLEL-LIGHT-CHANNEL BASED STEREO IMAGING SYSTEM

(71) Applicant: AMCHAEL VISUAL TECHNOLOGY CORPORATION, Hsinchu (TW)

(72) Inventor: Kai Michael Cheng, Lexington, KY (US)

(*) Notice: Subject to any disclaimer, the term of this patent is extended or adjusted under 35 U.S.C. 154(b) by 62 days.

(21) Appl. No.: 17/558,859

(22) Filed: Dec. 22, 2021

(65) Prior Publication Data
US 2022/0116575 A1    Apr. 14, 2022

Related U.S. Application Data

(63) Continuation-in-part of application No. 16/551,080, filed on Aug. 26, 2019, now Pat. No. 11,297,297, which is a continuation of application No. 15/591,695, filed on May 10, 2017, now abandoned.

(60) Provisional application No. 62/407,754, filed on Oct. 13, 2016.

(51) Int. Cl.
*H04N 13/128* (2018.01)
*G02B 13/00* (2006.01)
*G02B 30/27* (2020.01)
*H04N 13/229* (2018.01)
*H04N 13/239* (2018.01)

(52) U.S. Cl.
CPC ....... *H04N 13/128* (2018.05); *G02B 13/0065* (2013.01); *G02B 30/27* (2020.01); *H04N 13/229* (2018.05); *H04N 13/239* (2018.05); *H04N 2213/001* (2013.01)

(58) Field of Classification Search
CPC .. H04N 13/128; H04N 13/229; H04N 13/239; H04N 13/10; H04N 13/106; H04N 13/20; H04N 13/204; H04N 13/207; H04N 13/225; H04N 13/232; H04N 2213/001; G02B 27/2214; G02B 30/27; G02B 7/005; G02B 13/0065; G02B 13/004; G02B 13/007; G02B 13/0075
USPC .......................................... 359/472
See application file for complete search history.

(56) References Cited

U.S. PATENT DOCUMENTS

| | | | | |
|---|---|---|---|---|
| 8,870,379 B2* | 10/2014 | Choi | ............... | H04N 13/363 |
| | | | | 353/7 |
| 2010/0321477 A1* | 12/2010 | Iwasaki | ............... | H04N 13/218 |
| | | | | 348/E13.074 |
| 2013/0250410 A1* | 9/2013 | Cheng | ............... | G03B 35/10 |
| | | | | 359/466 |
| 2014/0132707 A1* | 5/2014 | Hashimoto | ......... | H04N 13/239 |
| | | | | 348/36 |

* cited by examiner

*Primary Examiner* — Stephone B Allen
*Assistant Examiner* — Jyotsna V Dabbi
(74) *Attorney, Agent, or Firm* — Patrick M. Torre; Stites & Harbison PLLC

(57) ABSTRACT

A stereo imaging system includes a pair of folded-parallel-light-channel (FPLC) units arranged to provide a virtual left side view and a virtual right side view of a scene. Each FPLC unit includes a fixed lens unit adapted to focus reflected light comprising an image of a scene to an image sensor and a light-redirecting unit comprising a reflector adapted to define a parallel image reflection path to the fixed lens unit via a collimated light beam.

18 Claims, 7 Drawing Sheets

FOLDED PARALLEL-LIGHT-CHANNEL BASED STEREO IMAGING SYSTEM

This application is a continuation-in-part utility patent application claiming priority to U.S. patent application Ser. No. 16/551,080 filed on Aug. 26, 2019, which is a continuation patent application claiming the benefit of U.S. patent application Ser. No. 15/591,695 filed on May 10, 2017, which in turn claims priority to U.S. Provisional Patent Application Ser. No. 62/407,754 filed on Oct. 13, 2016, the entirety of the disclosures of each of which are incorporated herein by reference.

TECHNICAL FIELD

The present disclosure relates to stereo/three-dimensional imaging. More specifically, this disclosure pertains to a compact folded-parallel-light-channel (FPLC) stereo imaging system synchronously generating a left view and a right view of a scene which can be compiled into a three-dimensional (3D) image. The disclosed stereo imaging system finds utility in a variety of devices including compact mobile devices such as cell phones and smartphones.

BACKGROUND OF THE INVENTION

A critical point in designing an embedded imaging system for a handheld or other mobile device such as a cell phone or smartphone is to ensure the height (thickness) of the imaging system is less than (or at least very close to) the thickness of the cell phone. The image sensor of a cell phone imaging system is of a fixed dimension (4.80×3.60 mm). To ensure images of the same size as the image sensor are produced, one cannot unlimitedly reduce the sizes of the lenses used in a cell phone imaging system. Hence, a telephoto camera usually cannot be used for a mobile device such as a smartphone since such a camera when equipped with camera comprising a plurality of lenses disposed to refract light to form an image at a cell phone camera image sensor (CPCIS), would require at least 14 mm for its height (see FIG. 1 for an example) while the thickness of a typical smartphone is between 7 and 9 mm only.

To allow a telephoto camera equipped with a CPCIS to be embedded in a smartphone, prior art devices are known (see FIG. 2) wherein the telephoto camera is "folded" by inserting a light-folding mirror in the lens system so that the optical axis (see dotted line) is redirected from vertical to horizontal once it reaches the folding mirror. The image sensor is installed on an orientation defining a plane oriented vertically to a plane defined by the ground, instead of parallel to a plane defined by the ground. By folding a telephoto camera equipped with a CPCIS in this manner, the height of the camera can be made as small as 7 mm and consequently can be embedded into a smart cell phone. As examples, see U.S. Pat. No. 9,316,810 to Mercado and U.S. Pat. No. 9,172,856 to Bohn et al., the entire disclosures of each of which are incorporated herein by reference.

In theory, a stereo imaging system could be provided by arranging two identical imaging systems such as those shown in FIG. 2 symmetrically to define the hypothetical construct shown in FIG. 3. Such a hypothetical stereo imaging system could potentially be embedded in a mobile device such as a larger, thicker cell phone or smartphone. However, consumer preferences are for smaller, thinner cell phones and smart phones that do not sacrifice features such as processing power, camera quality, and the like for such reduced size/thickness. Because of the vertical portion of the device the stereo imaging system illustrated in FIG. 3 defines a greater vertical (x-axis) profile, thus requiring additional packaging space along an x-axis that in smaller mobile devices such as smaller, thinner cell phones and smartphones is at a high premium. Moreover, as shown in FIG. 3 individual light rays reflect at individual angles from the reflector and must be collected/rerouted to an image sensor to transmit the image. The relative spacing of the lenses and reflectors, and of the two light folding lens units relative to one another to define the device disparity or interocular distance, is critical and cannot be altered without sacrificing image quality or requiring additional corrective measures. So, while it may be possible to use the depicted light folding lens unit arrangement of FIG. 3 to fold light to reflect incoming 2D images to an image sensor for processing into a 3D image, because of the configuration of each lens unit the interocular distance/spacing between the lens units cannot be altered without negatively impacting the quality (i.e., accuracy of the depth values of the combined 2D images) of the resulting created 3D image.

Accordingly, a need in the art is identified for improvements to imaging systems for smaller, thinner mobile devices, providing stereo imaging systems capable of converting 2D images into 3D images and which can be implemented in smaller, thinner modern cell phones and smartphones. The following disclosure describes a folded-parallel-light-channel stereo imaging system for such mobile devices.

SUMMARY OF THE INVENTION

To solve the foregoing problems and address the identified need in the art, in one aspect of the present disclosure a stereo imaging system comprising: two folded-parallel-light-channel (FPLC) units arranged to provide a virtual two-dimensional left-side view and a virtual two-dimensional right-side view of a scene. Each FPLC unit includes: a) a fixed lens unit adapted to focus reflected light comprising an image of a scene onto an image sensor; and b) a light-folding unit comprising a reflector adapted to define a parallel image reflection path along the stereo imaging system y-axis to the fixed lens unit via a collimated light beam. The fixed lens unit and the light-folding unit of each of the FPLC units are disposed at a pre-determined spaced distance from one another along the y-axis to provide a desired disparity or interocular distance functionality for the system. The stereo imaging system is adapted to consolidate the virtual two-dimensional left-side and right-side view into a single three-dimensional image.

In embodiments, the reflector defines a planar reflective surface. The system may further include a concave lens disposed between the reflector and an image inlet of each FPLC unit, the concave lens defining a lens field of view that is the same as a field of view of the fixed lens unit.

In other embodiments, the reflector defines an arcuate reflective surface. The arcuate reflective surface may be configured to define a reflector field of view that is the same as a field of view of the fixed lens unit.

In embodiments, the fixed lens unit defines one of a wide-angle lens unit or a telephoto lens.

In another aspect, a stereo imaging system is provided, comprising two folded-parallel-light-channel (FPLC) units, arranged to provide a virtual two-dimensional left-side view and a virtual two-dimensional right-side view of a scene. As before, the stereo imaging system is adapted to consolidate the virtual two-dimensional left-side and right-side view into a single three-dimensional image. The fixed lens unit and the light-folding unit of each of the FPLC units are substantially as described above and are disposed at a pre-determined spaced distance from one another along the y-axis to provide a desired disparity or interocular distance functionality for the system. The stereo imaging system is adapted to consolidate the virtual two-dimensional left-side and right-side view into a single three-dimensional image. The fixed light-folding unit incorporates a planar reflector and may incorporate a concave lens configured to define a reflector field of view that is the same as a field of view of the fixed lens unit as described above.

In yet another aspect, a stereo imaging system is provided, comprising two folded-parallel-light-channel (FPLC) units, arranged to provide a virtual two-dimensional left-side view and a virtual two-dimensional right-side view of a scene. As before, the stereo imaging system is adapted to consolidate the virtual two-dimensional left-side and right-side view into a single three-dimensional image. The fixed lens unit and the light-folding unit of each of the FPLC units are substantially as described above and are disposed at a pre-determined spaced distance from one another along the y-axis to provide a desired disparity or interocular distance functionality for the system. The stereo imaging system is adapted to consolidate the virtual two-dimensional left-side and right-side view into a single three-dimensional image. The fixed light-folding unit incorporates a convex reflector and may incorporate a concave lens configured to define a reflector field of view that is the same as a field of view of the fixed lens unit as described above.

These and other embodiments, aspects, advantages, and features of the present disclosure will be set forth in the description which follows, and in part will become apparent to those of ordinary skill in the art by reference to the following description and referenced drawings or by practice. The aspects, advantages, and features of the disclosure are realized and attained by means of the instrumentalities, procedures, and combinations particularly pointed out in the appended claims. Unless otherwise indicated, any patent and/or non-patent citations discussed herein are specifically incorporated by reference in their entirety into the present disclosure.

DETAILED DESCRIPTION OF THE INVENTION

In the following detailed description of the illustrated embodiments, reference is made to the accompanying drawings that form a part hereof, and in which is shown by way of illustration, specific embodiments in which the invention may be practiced. These embodiments are described in sufficient detail to enable those skilled in the art to practice the invention. Also, it is to be understood that other embodiments may be utilized and that process, reagent, materials, software, and/or other changes may be made without departing from the scope of the present invention.

Figure 4:
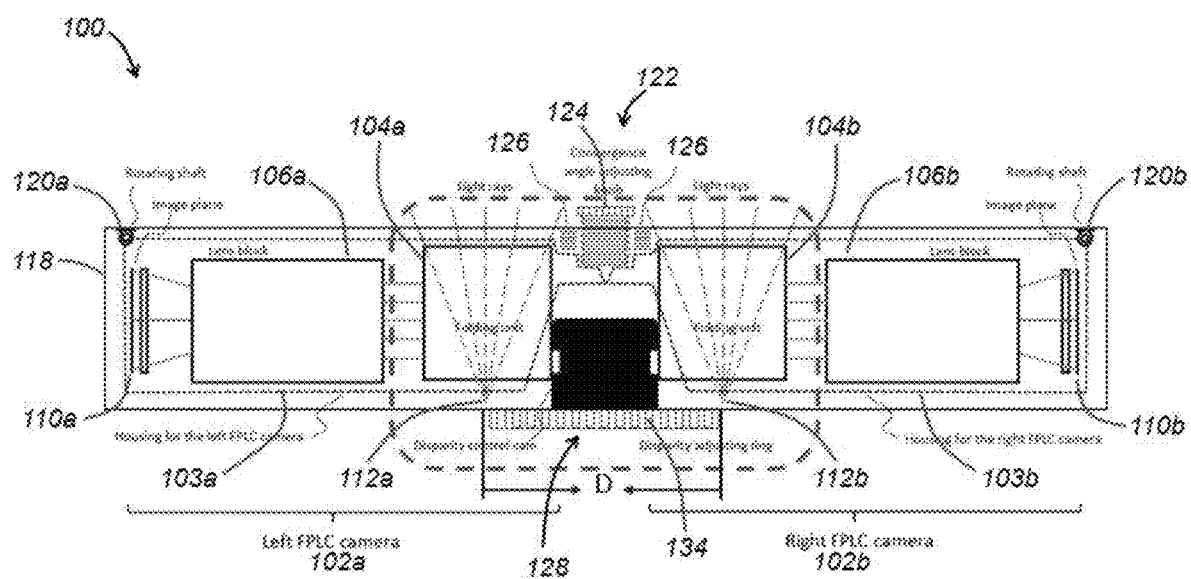
FIG. 4 schematically illustrates a stereo imaging system according to the present disclosure.
Figure 5:
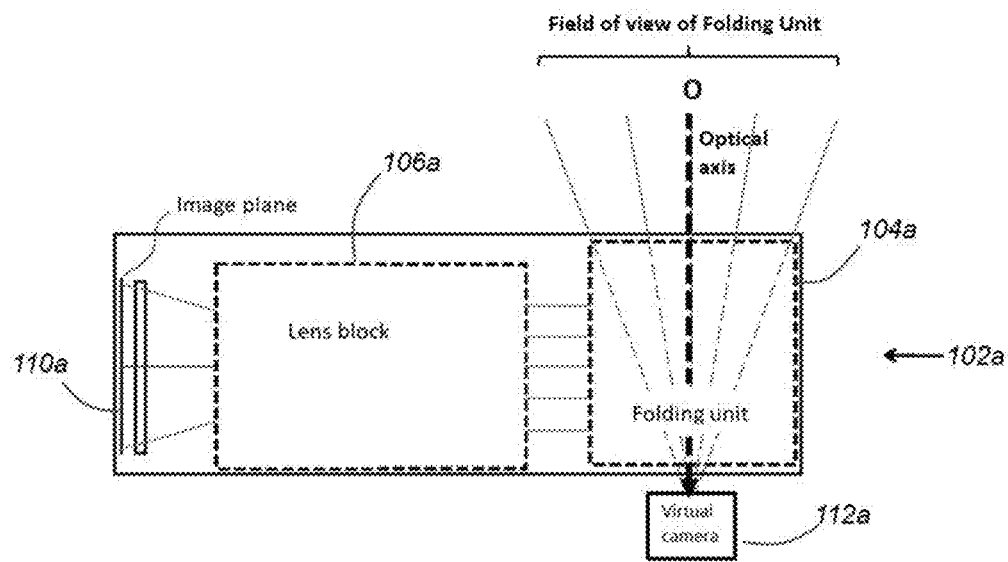
FIG. 5 shows in isolation a folded-parallel-light-channel-based camera unit for use in the stereo imaging system of FIG. 4.

The present disclosure is directed to a stereo imaging system 100 for a mobile device that not only has a lesser thickness dimension, but is also provided with the capacity of disparity and convergence angle control. With reference to FIGS. 4 and 5, the stereo imaging system 100 includes two substantially identical FPLC based camera units 102a, 102b disposed symmetrically to synchronously generate a left view and a right view of a scene viewed by the stereo imaging system. Each FPLC-based camera unit 102a, 102b is contained in a separate pivotable housing 103a, 103b. The FPLC-based camera units 102a, 102b each include a light-folding unit 104a, 104b to fold a light path (see dotted lines) entering the FPLC-based camera, and a multiple-lens block unit 106a, 106b to form images. Light rays entering the light-folding unit 104a, 104b of the FPLC-based camera 102a, 102b on a first light path are redirected by a folding element 108a, 108b (not shown in this view) on to a second light path as a collimated light beam comprising parallelly-oriented light rays (see solid lines). The folding element 108a, 108b may include a flat reflective surface or a curved reflective surface. The parallelly-oriented light rays of the collimated light beam are then refracted by lenses (not shown in this view) of the multiple-lens block unit 106a, 106b in the second light path to form an image at an image sensor 110a, 110b. As will be described, each FPLC based camera 102a, 102b may be configured to provide a telephoto lens system embodiment or a wide-angle lens system embodiment. Each embodiment satisfies the requirement of parallelly-oriented light ray transmission between the light-folding unit 104a, 104b and the multiple-lens block unit 106a, 106b.

As shown representatively in FIG. 5, each FPLC-based camera unit 102a, 102b by its configuration respectively defines a virtual camera 112a, 112b (only virtual camera 112a is shown in the drawing figure) which represents, respectively, a left or a right view of the scene as transmitted to each image sensor 110a, 110b.

In either embodiment, disparity of the left view and the right view of the stereo imaging system 100 can be adjusted by adjusting a distance between the light-folding units 104a, 104b of the two FPLC based camera units 102a, 102b. Likewise, a convergence angle of the left view and the right view of the stereo imaging system 100 can be adjusted by adjusting an angle between the left FPLC based camera unit 102a and the right FPLC based camera unit 102b. Mechanisms for effecting these adjustments will be described below.

Figure 7:
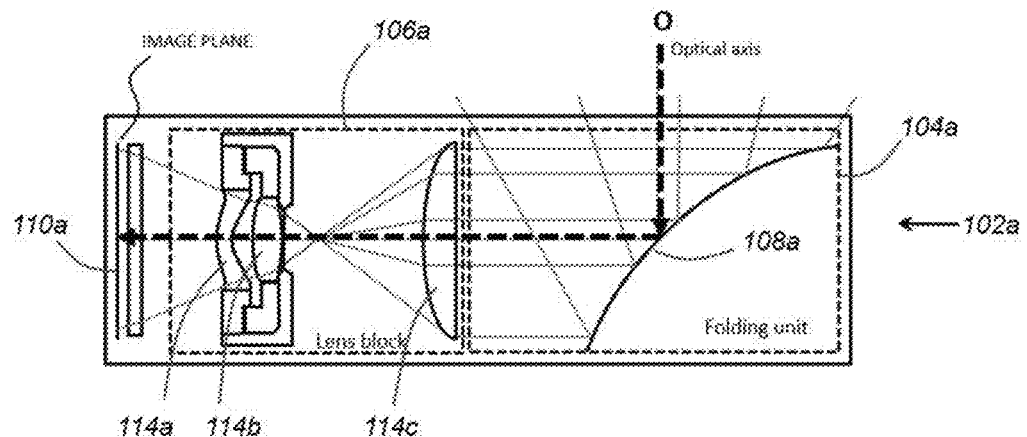
FIG. 7 shows in isolation a folded-parallel-light-channel-based camera unit for use in the stereo imaging system of FIG. 4, comprising a folding unit having a curved reflective surface and a multiple-lens block unit comprising three lenses.
Figure 8:
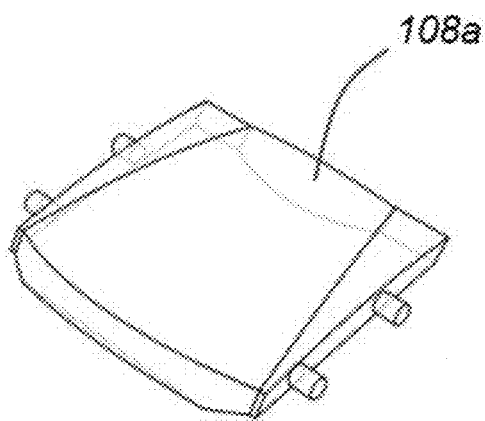
FIG. 8 shows a curved reflector for use in the camera unit of FIG. 7.
Figure 9:
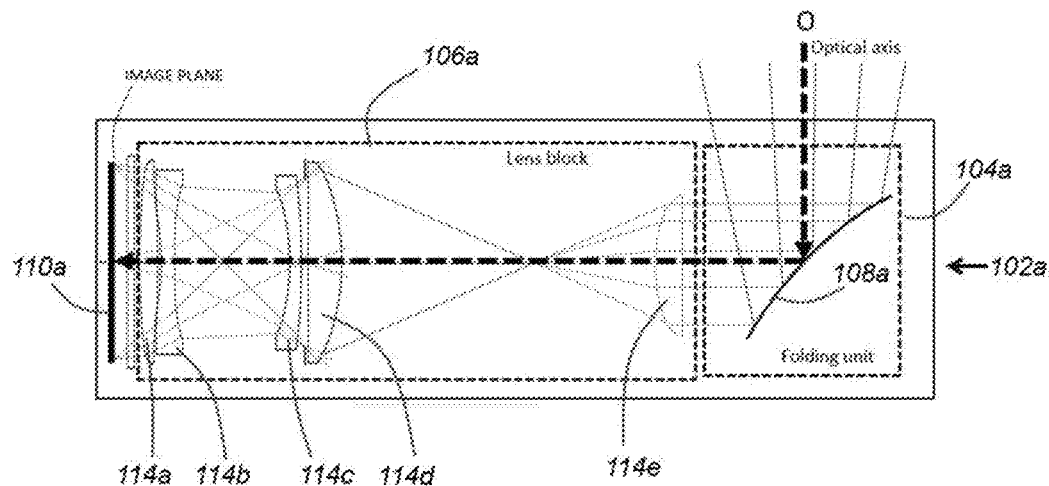
FIG. 9 shows in isolation a folded-parallel-light-channel-based camera unit for use in the stereo imaging system of FIG. 4, comprising a folding unit having a curved reflective surface and a multiple-lens block unit comprising five lenses.

FIGS. 7, 8, and 9 illustrate implementation of FPLC-based camera units 102a, 102b comprising folding element 108a, 108b having curved reflective surfaces. In the embodiment depicted in FIG. 7, the multiple-lens block unit 106a comprises three lenses 114a, 114b, 114c. In the embodiment depicted in FIG. 9, the multiple-lens block unit 106a comprises five lenses 114a, 114b, 114c, 114d, and 114e. As will be appreciated, the curved folding elements 108a, 108b are provided having a curvature whereby a field of view of the curved folding elements 108a, 108b is the same as that of a field of view of the multiple-lens block units 106a, 106b. In this embodiment, the field of view of the curved folding elements 108a, 108b defines the field of view of the FPLC-based camera units 102a, 102b.

Figure 10:
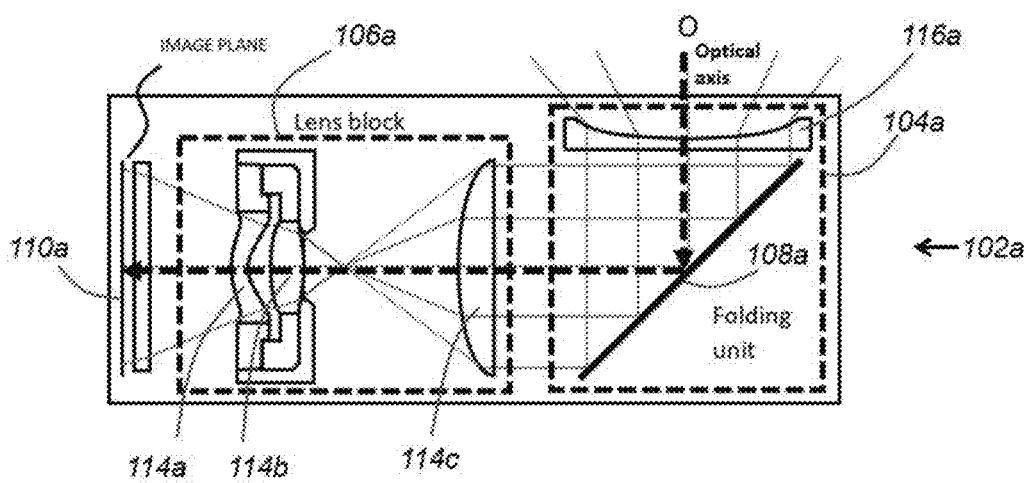
FIG. 10 shows in isolation a folded-parallel-light-channel-based camera unit for use in the stereo imaging system of FIG. 4, comprising a folding unit having a planar reflective surface and a multiple-lens block unit comprising three lenses.
Figure 11:
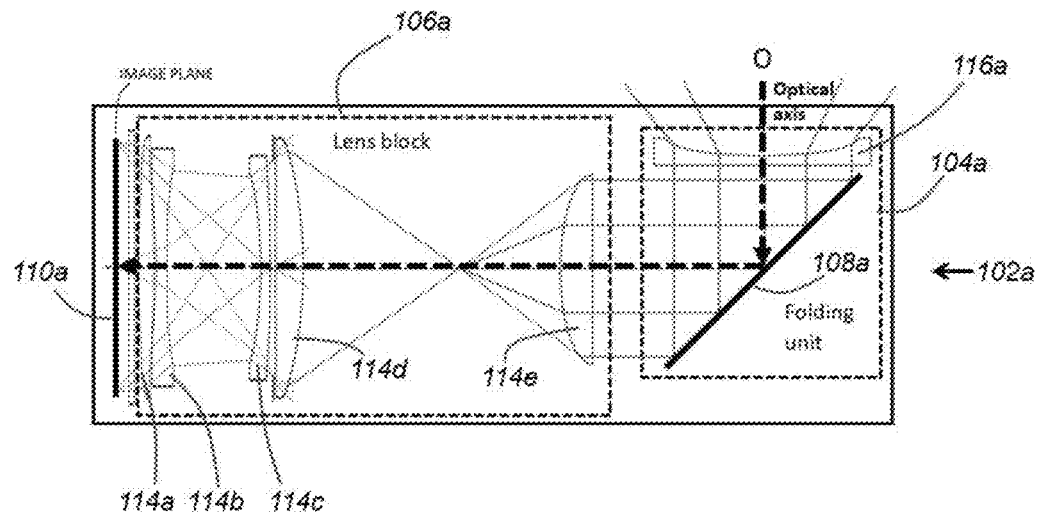
FIG. 11 shows in isolation a folded-parallel-light-channel-based camera unit for use in the stereo imaging system of FIG. 4, comprising a folding unit having a planar reflective surface and a multiple-lens block unit comprising five lenses.

FIGS. 10 and 11 illustrate implementation of FPLC-based camera units 102a, 102b comprising folding elements 108a, 108b having planar reflective surfaces. FIG. 10 shows an FPLC-based camera unit 102a having a multiple-lens block unit 106a comprising three lenses 114a, 114b, 114c, whereas FIG. 11 shows an FPLC-based camera unit 102a having a multiple-lens block unit 106a comprising five lenses 114a, 114b, 114c, 114d, and 114e. In these embodiments, concave lenses 116a, 116b (only lens 116a shown in the drawings) are provided as part of the light-folding units 104a, 104b, disposed in the light path entering the FPLC-based camera units. As will be appreciated, the concave lenses 116a, 116b are provided having a curvature whereby a field of view of the concave lenses 116a, 116b is the same as that of a field of view of the multiple-lens block units 106a, 106b. In this embodiment, the field of view of the concave lenses 116a, 116b defines the field of view of the FPLC-based camera units 102a, 102b.

As will be appreciated, by ensuring that the field of view of the light folding units 104a, 104b is the same as that of the multiple-lens block units 106a, 106b as described above, the multiple-lens block units 106a, 106b are able to provide an image of a scene that is the same size as that of the image sensors 110a, 110b. Further, because of the parallel path of travel of light rays as a collimated light beam passing from the light-folding elements 108a, 108b to the multiple-lens block units 106a, 106b, the fields of view of the light folding units 104a, 104b are independent of the spacing or distance of the light folding units from the multiple lens block units 106a, 106b. By this feature, adjustment of disparity without requiring movement of the multiple-lens block units 106a, 106b and/or the image sensors 110a, 110b is made possible by the mechanisms described below.

FIGS. 7 and 10 illustrate wide-angle multiple lens block units 106a, 106b paired respectively with curved and planar light-folding units 104a, 104b. In turn, FIGS. 9 and 11 illustrate telephoto multiple-lens block units 106a, 106b paired respectively with curved and planar light-folding units 104a, 104b. In each case, the field of view of the light-folding units 104a, 104b is the same as that of the field of view of the multiple-lens block units 106a, 106b. It will be appreciated, however, that the described stereo imaging system 100 is not limited to wide-angle and telephoto lens systems, but instead may be configured with any suitable lens system wherein the light-folding units 104a, 104b can be configured with a same field of view as the multiple-lens block units 106a, 106b such that the multiple-lens block units can produce an image of a scene that is the same size as the image sensors 110a, 110b comprised in the stereo imaging system.

As described above in the discussion of FIGS. 4 and 5, the light-folding units 104a, 104b define virtual cameras 112a, 112b, described respectively in reference to an orientation of the stereo imaging system 100 as the left and right virtual camera 112a, 112b. The distance D (see FIG. 4 and FIG. 6) between the left and right virtual camera 112a, 112b is variously called the interocular distance, virtual camera distance, virtual camera disparity, or simply disparity. It is this distance D that determines the disparity between a left view and a right view of a scene. In turn, each virtual camera 112a, 112b has a line of sight, referred to as the optical axis O (see FIGS. 5, 7, and 9-11). The angle between the optical axes of the virtual cameras 112a, 112b is called the convergence angle A (see FIG. 6). Advantageously, the described stereo imaging system 100 of the present disclosure provides for adjustment of both the interocular distance/disparity and convergence angle.

Figure 6:
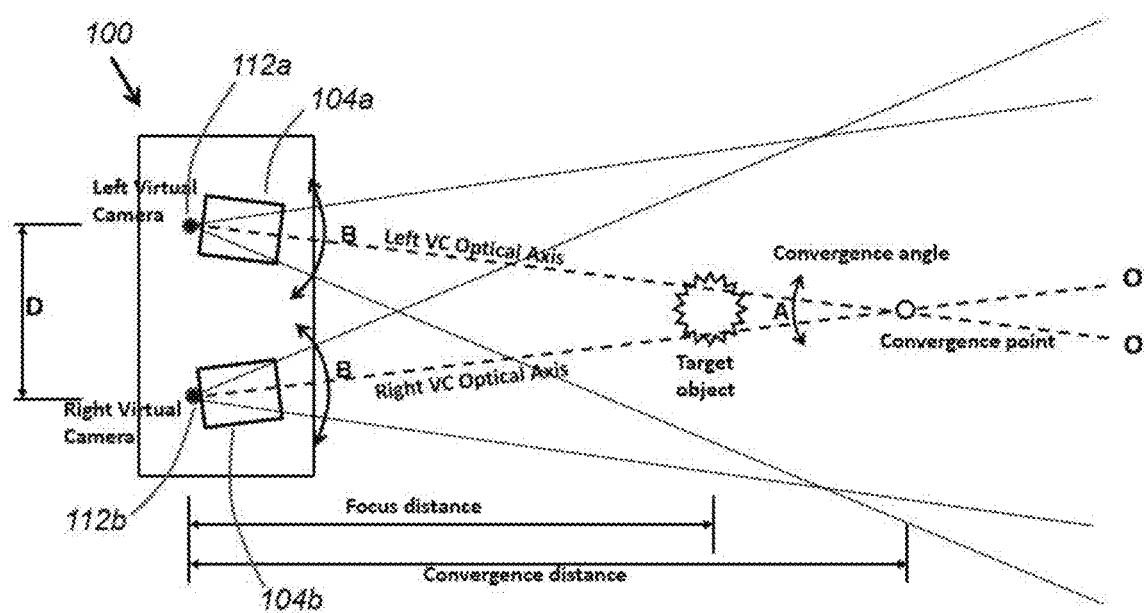
FIG. 6 shows operation of a convergence angle adjusting mechanism for the stereo imaging system of FIG. 4.

With regard to adjustment of convergence angle, referring back to FIG. 4 and to FIG. 6, each FPLC-based camera unit 102a, 102b housing 103a, 103b is pivotally (see FIG. 6, arrows B) attached to a stereo imaging system housing 118. In the depicted embodiment, the FPLC-based camera units 102a, 102b are respectively pivotally attached to the stereo imaging system housing 118 by a rotating shaft 120a, 120b. A convergence-angle-adjusting mechanism 122 is provided, in the depicted embodiment comprising a biasing actuator 124 and at least two biasing members 126. Rotating the biasing actuator 124 in a first direction will urge each camera unit housing 103a, 103b to rotate about an axis defined by the rotating shafts 120a, 120b, thus altering an angle between the FPLC-based camera unit 102a, 102b optical axes O and so altering a convergence angle of the stereo imaging system 100. Rotating the biasing actuator 124 in a second, opposed direction will return the camera unit housings to their original orientations, assisted by the biasing actions of the biasing members 126. In turn, the biasing action of the biasing members 126 ensures stability of the adjusting process.

Figure 12:
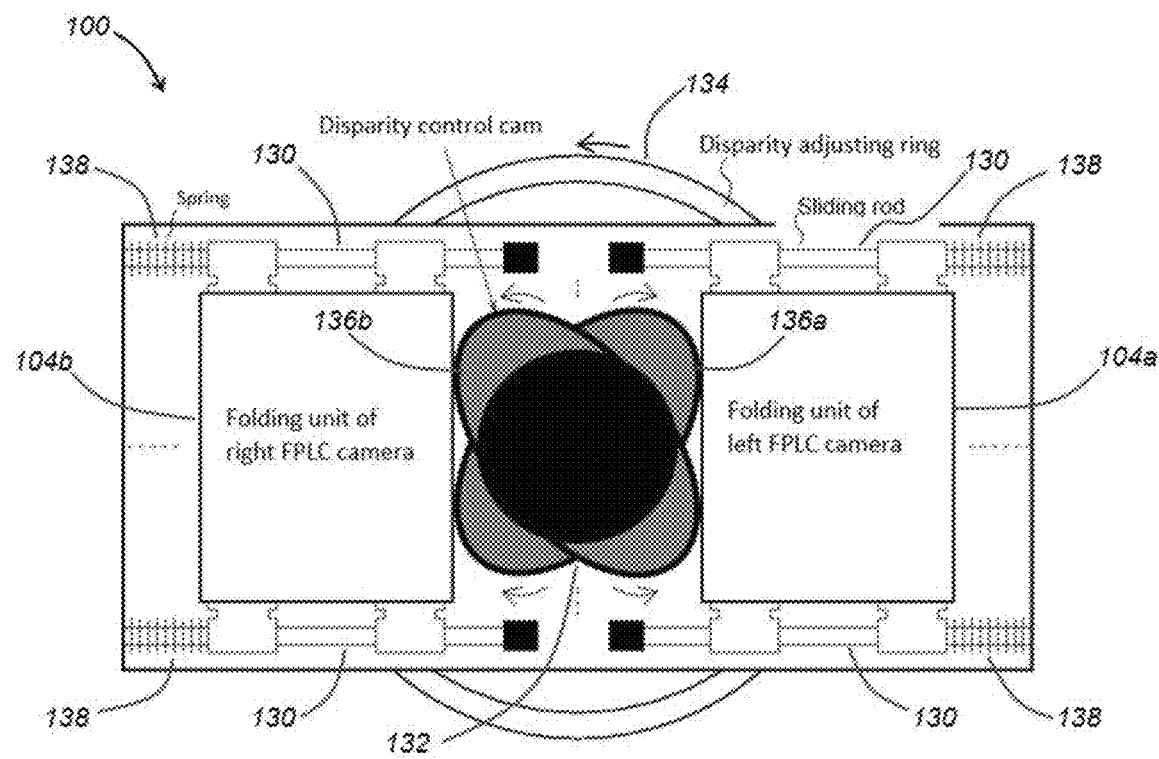
FIG. 12 illustrates a disparity adjusting mechanism for the stereo imaging system of FIG. 4.

With reference to FIGS. 4 and 12, a disparity adjusting mechanism 128 is also provided. In the depicting embodiment, the disparity adjusting mechanism 128 comprises an arrangement of guide rods 130 to which each light folding unit 104a, 104b is slidingly attached. A cam array 132 is provided, disposed between each light folding unit 104a, 104b and under control of a disparity adjusting actuator 134. In the depicted embodiment, the cam array 132 comprises a pair of elliptical cams 136a, 136b disposed whereby actuating the disparity adjusting actuator 134 causes the cams 136a, 136b to rotate in opposed directions (see arrows). As will be appreciated, this will bias the light folding units 104a, 104b, translating them laterally to increase a distance therebetween. In turn, a plurality of biasing members 138, in the depicted embodiment being springs concentrically around each guide rod 130, are disposed to bias the light folding units 104a, 104b towards one another in an opposite direction to the biasing force imposed by the cam array 132. Thus, by this disparity adjusting mechanism 128 the light folding units 104a, 104b may be translated laterally to alter a distance therebetween, and by this mechanism disparity can be controlled for the stereo imaging system 100. Likewise, the biasing members 138 provide stability to the disparity adjusting process.

Figure 1:
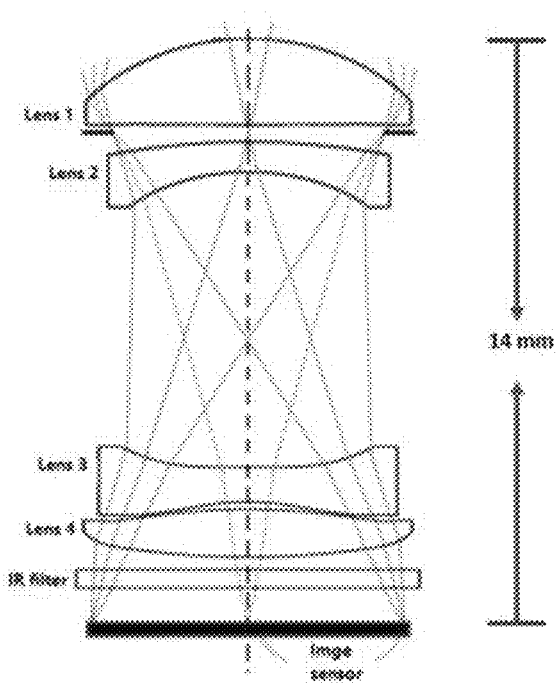
FIG. 1 depicts a prior art imager for a mobile device such as a cellphone or smartphone.
Figure 2:
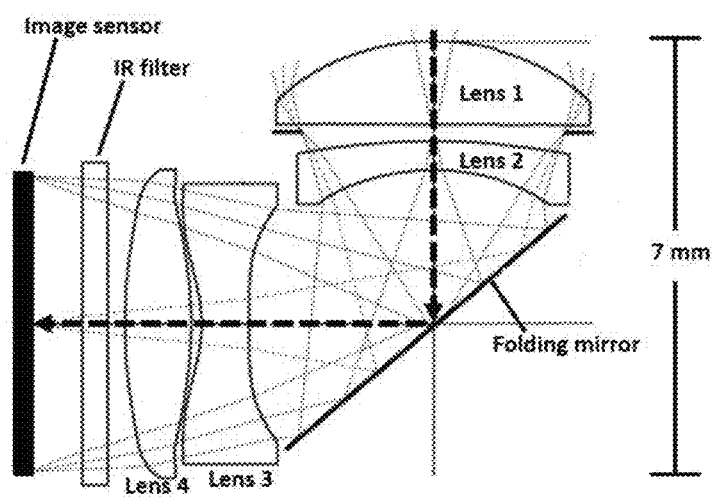
FIG. 2 depicts a prior art folded light-path imager for a mobile device such as a cellphone or smartphone.

In yet another embodiment of the disclosed stereo imaging system, it is contemplated to provide such a system comprising a pair of fixed FPLC units as described to allow incorporating a telephoto lens or other lens arrangements into a mobile device such as a cell phone or smartphone. As discussed supra, it is feasible to configure a stereo imaging system to create 3D images from captured 2D images of a scene by configuring a pair of light-folding lens units as shown in FIG. 2 into the hypothetical arrangement disclosed in FIG. 3 to allow "folding" light/images. This reduces the footprint of the stereo imaging system to potentially allow implementation in mobile devices such as larger cell phones/smartphones. However, implementation of such a stereo imaging system into mobile devices would suffer from numerous disadvantages, primarily related to requiring additional packaging space that would be required and potentially not available in smaller mobile devices such as cell phones or smartphones without sacrificing other needed or desirable functionalities. Further, such systems would be hampered by the relatively short focal length afforded to small devices such as cell phone/smartphone cameras.

Figure 3:
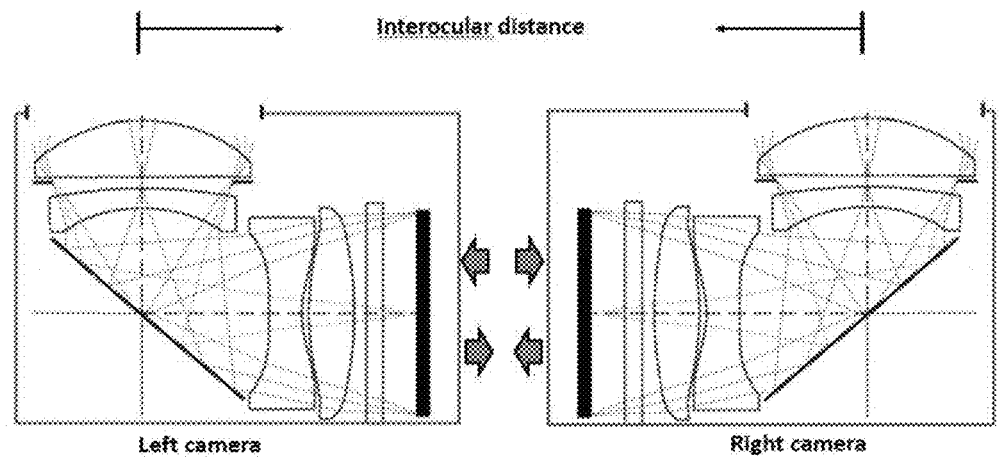
FIG. 3 illustrates a hypothetical stereo imager derived from the imager of FIG. 2.

In the light-folding lens unit depicted in FIG. 2 and the hypothetical stereo imaging system depicted in FIG. 3, images (light rays) are received through a first set of lenses and redirected to a second set of lenses by the interposed reflector. These light-folding lens units thus have three elements: a) a vertical (y-axis) portion including a first set of lenses; b) the intervening reflector; and c) a horizontal (x-axis) portion including a second set of lenses. Because of the vertical portion, the hypothetical stereo imaging system of FIG. 3 would define a greater vertical (y-axis) profile, requiring additional packaging space along the y-axis that is at a high premium in smaller mobile devices such as cell phones and smartphones. Moreover, as shown in FIG. 3 individual light rays reflect at individual angles from the reflector. So, while it might be possible to use the hypothetical system of FIG. 3 to fold light to reflect incoming images to an image sensor, because of the configuration of the lenses and reflector of each light-folding lens unit, the interocular distance/spacing between the individual light-folding lens units cannot be altered without negatively impacting the quality (i.e., accuracy of the depth values of the combined 2D images) of the resulting created 3D image.

To address these and other problems, the present disclosure is also directed to a stereo imaging system 200 which does not require light-folding lens units as shown in FIGS. 2-3 or disparity/convergence control as shown in FIG. 4. Instead, the stereo imaging system 200 implements the configuration of the FPLC-based camera units 102a, 102b described supra (see FIGS. 4-5) whereby the functions of light folding and concentration of images to image sensors 110a, 110b at a desired field of view size are respectively provided by separate light folding units 104a, 104b and multiple-lens block units 106a, 106b (telephoto lenses in the depicted embodiment), each arrayed in a coplanar configuration along a device x-axis.

Figure 13:
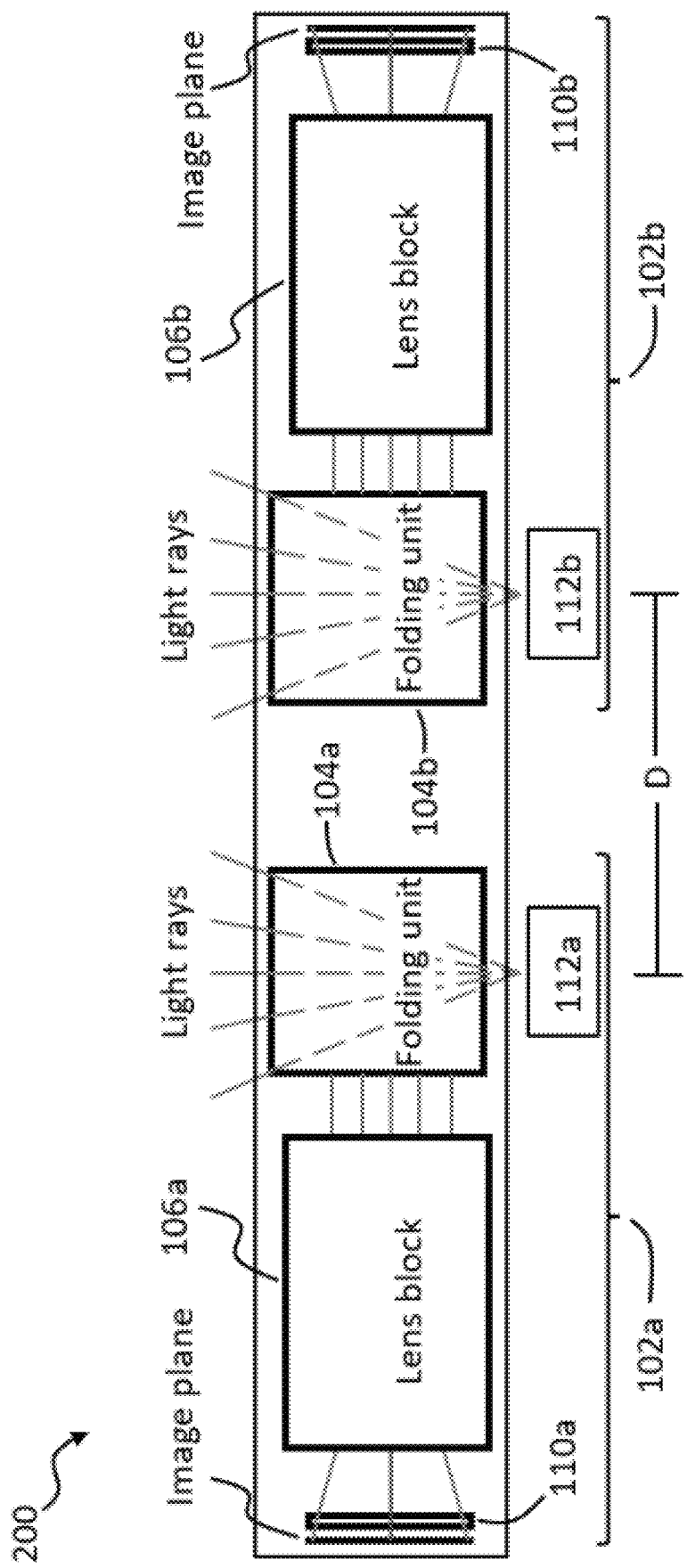
FIG. 13 illustrates a stereo imaging system comprising two fixed folded-parallel-light-channel-based camera units.

With reference to FIG. 13, as is clear this configuration provides a more compact profile particularly along the y-axis (i.e., depth of the device) because it is not necessary to dispose lenses above the light folding units 104a, 104b. Equally, because all lenses are contained within the multiple-lens block units 106a, 106b, it is possible to alter a distance D between the FPLC-based camera units 102a, 102b (and thereby a disparity/interocular distance of the stereo imaging system) according to the particular mobile device (not shown) in which the stereo imaging system 200 will be implemented. This available increase in disparity further advantageously allows a greater range of optical axes settings of the FPLC-based camera units 102a, 102b, i.e., to a greater or lesser included angle relative to one another as needed to alter a focal point of the incorporated stereo system 200 according to the dimensions and capabilities of the mobile device in which it will be implemented. As will be appreciated, this feature allows extending the focal point of a mobile device camera(s) incorporating the presently described stereo imaging system 200 beyond that available for a conventional mobile device camera.

This is because, as is known, 3D images can be created from any device including cameras capable of capturing two 2D images of a scene and combining them such as by a conventional triangulation algorithm. However, the quality of the created 3D image will vary according to the set disparity and focal point (convergence angle) of the cameras used. That focal point is set very close to the device by the limitations of conventional cameras for mobile devices. So, with conventional cell phone or smartphone cameras, even with the hypothetical device of FIG. 3 acceptable 3D image quality could only be achieved by taking 2D images at a distance that is very close to the set focal point of the cameras used.

The device of FIG. 13 on the other hand, in addition to providing a reduced y-axis profile and therefore allowing implementation in a thinner device, allows use of 2D images captured from a greater distance than would be possible using the hypothetical device of FIG. 3 while still being able to create 3D images from such 2D images because of the enhanced focal point distances achievable. As described above, this is because for the device of FIG. 13 it is possible to alter disparity/interocular distance by separating the individual FPLC-based camera units 102a, 102b to the greatest extent allowed by the dimensions of the selected mobile device. By this ability to increase disparity, it also becomes possible to change the optical axes of the cameras relative to one another to a greater degree, thus allowing for the longest possible focal point for the cameras even without features of adjustable disparity and convergence control. Still more, by separating the light folding and lens functionalities of the FPLC-based camera units 102a, 102b into discrete light folding units 104a, 104b and multiple-lens block units 106a, 106b, incorporation of mechanisms such as telephoto lenses is possible even when incorporating the camera units into modern, thinner mobile devices such as cell phones/smartphones.

Summarizing, the present disclosure provides stereo imaging systems 100, 200 wherein a width/height dimension of the system is minimized, and so the described stereo imaging systems are readily adapted to small, thin mobile devices such as smartphones. Because the light folding and lens functionalities are separated into discrete units contained in the described system, a lower profile along the y-axis of a device incorporating them is achievable. In turn, because the described light folding units 104a, 104b reflect light/images to the multiple lens block units 106a, 106b as a collimated light beam comprising parallel light rays, the field of view of the light folding units 104a, 104b is independent of any distance between the light folding units and the multiple-lens block units. Thus, disparity control is possible for the stereo imaging system 100 without requiring movement of the multiple lens block units 106a, 106b and/or the image sensors 110a, 110b. This further contributes to the compact design of the described stereo imaging system 100.

The images captured by image sensors 110a, 110b representing respectively a left and a right view of a scene can then be processed to provide stereoscopic images and/or image-plus-depth images, i.e. three-dimensional images. Likewise, use of the described system to provide still images and video images in stereo and/or image-plus-depth is contemplated. A number of suitable methods, systems, and computer program products for processing images to provide stereoscopic and/or image-plus-depth images are known and contemplated for use herein, including without intending any limitation the methods described in U.S. Pat. Nos. 8,648,808, 8,964,004, 9,201,519, and 9,310,857, the disclosures of which are incorporated herein by reference in their entirety. In turn, the described system is readily adaptable of other camera types, including without intending any limitation compact dual-lens reflex cameras.

One of ordinary skill in the art will recognize that additional embodiments of the invention are also possible without departing from the teachings herein. Thus, the foregoing description is presented for purposes of illustration and description of the various aspects of the invention, and one of ordinary skill in the art will recognize that additional embodiments of the invention are possible without departing from the teachings herein. This detailed description, and particularly the specific details of the exemplary embodiments, is given primarily for clarity of understanding, and no unnecessary limitations are to be imported, for modifications will become obvious to those skilled in the art upon reading this disclosure and may be made without departing from the spirit or scope of the invention. Relatively apparent modifications, of course, include combining the various features of one or more figures with the features of one or more of other figures. All such modifications and variations are within the scope of the invention as determined by the appended claims when interpreted in accordance with the breadth to which they are fairly, legally and equitably entitled.

What is claimed is:

1. A stereo imaging system, comprising:
   two folded-parallel-light-channel (FPLC) units arranged to provide a virtual two-dimensional left-side view and a virtual two-dimensional right-side view of a scene, each FPLC unit comprising:
   a) a fixed lens unit adapted to focus reflected light comprising an image of a scene onto an image sensor, and
   b) a light-folding unit comprising a reflector adapted to define a parallel image reflection path along the stereo imaging system x-axis to the fixed lens unit via a collimated light beam;
   wherein the stereo imaging system is adapted to consolidate the virtual two-dimensional left-side and right-side view into a single three-dimensional image.

2. The stereo imaging system according to claim 1, wherein the fixed lens unit and the light-folding unit of each of the FPLC units are disposed at a pre-determined spaced distance from one another along the x-axis to provide a desired disparity or interocular distance functionality for the stereo imaging system.

3. The stereo imaging system according to claim 1, wherein the reflector defines a planar reflective surface.

4. The stereo imaging system according to claim 3, further including a concave lens disposed between the reflector and an image inlet of each FPLC unit.

5. The stereo imaging system according to claim 4, wherein the concave lens defines a lens field of view that is the same as a field of view of the fixed lens unit.

6. The stereo imaging system according to claim 1, wherein the reflector defines an arcuate reflective surface.

7. The stereo imaging system according to claim 6, wherein the arcuate reflective surface is configured to define a reflector field of view that is the same as a field of view of the fixed lens unit.

8. The stereo imaging system according to claim 1, wherein the fixed lens unit defines one of a wide-angle lens unit or a telephoto lens.

9. A stereo imaging system, comprising:
   two folded-parallel-light-channel (FPLC) units arranged to provide a virtual two-dimensional left-side view and a virtual two-dimensional right-side view of a scene, each FPLC unit comprising:
   a) a fixed lens unit adapted to focus reflected light comprising an image of a scene onto an image sensor, and
   b) a light-folding unit comprising a planar reflector adapted to define a parallel image reflection path along the stereo imaging system x-axis to the fixed lens unit via a collimated light beam;
   wherein the stereo imaging system is adapted to consolidate the virtual two-dimensional left-side and right-side view into a single three-dimensional image.

10. The stereo imaging system according to claim 9, wherein the fixed lens unit and the light-folding unit of each of the FPLC units are disposed at a pre-determined spaced distance from one another along the x-axis to provide a desired disparity or interocular distance functionality for the stereo imaging system.

11. The stereo imaging system according to claim 9, further including a concave lens disposed between the planar reflector and an image inlet of each FPLC unit.

12. The stereo imaging system according to claim 11, wherein the concave lens defines a lens field of view that is the same as a field of view of the fixed lens unit.

13. The stereo imaging system according to claim 9, wherein the fixed lens unit defines one of a wide-angle lens or a telephoto lens.

14. A stereo imaging system, comprising:
   two folded-parallel-light-channel (FPLC) units arranged to provide a virtual two-dimensional left-side view and a virtual two-dimensional right-side view of a scene, each FPLC unit comprising:
   a) a fixed lens unit adapted to focus reflected light comprising an image of a scene onto an image sensor, and
   b) a light-folding unit comprising a convex reflector adapted to define a parallel image reflection path along the stereo imaging system x-axis to the fixed lens unit via a collimated light beam;
   wherein the stereo imaging system is adapted to consolidate the virtual two-dimensional left-side and right-side view into a single three-dimensional image.

15. The stereo imaging system according to claim 14, wherein the fixed lens unit and the light-folding unit of each of the FPLC units are disposed at a pre-determined spaced distance from one another along the x-axis to provide a desired disparity or interocular distance functionality for the stereo imaging system.

16. The stereo imaging system according to claim 14, further including a concave lens disposed between the convex reflector and an image inlet of each FPLC unit.

17. The stereo imaging system according to claim 14, wherein the convex reflector is configured to define a reflector field of view that is the same as a field of view of the fixed lens unit.

18. The stereo imaging system according to claim 14, wherein the fixed lens unit defines one of a wide-angle lens or a telephoto lens.

\* \* \* \* \*